May 9, 1950 M. L. FAST 2,506,713
CAM OPERATED CLUTCH
Filed Nov. 9, 1945 3 Sheets-Sheet 1
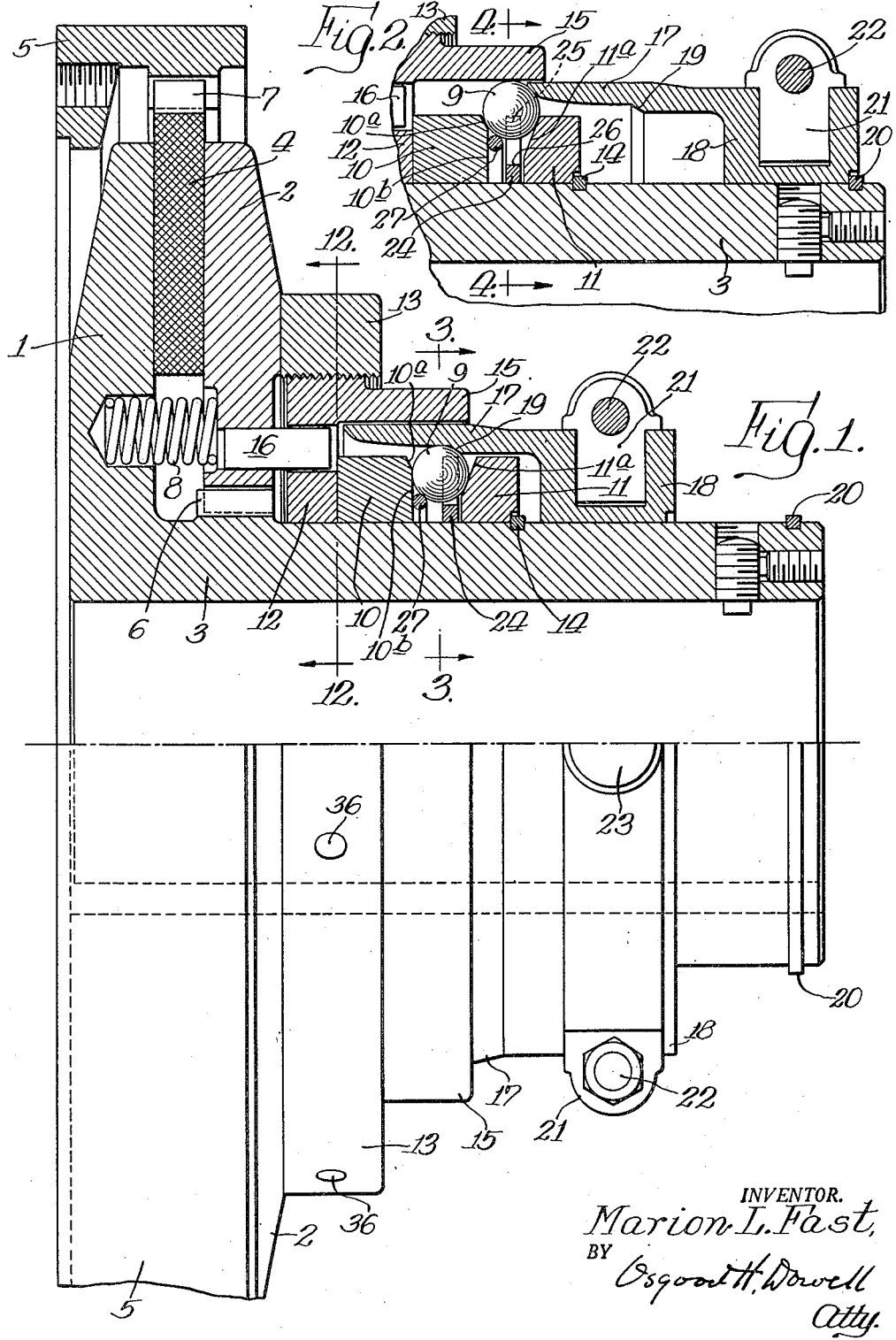
INVENTOR.
Marion L. Fast,
BY Osgood H. Dowell
Atty.

May 9, 1950 M. L. FAST 2,506,713
CAM OPERATED CLUTCH
Filed Nov. 9, 1945 3 Sheets-Sheet 2
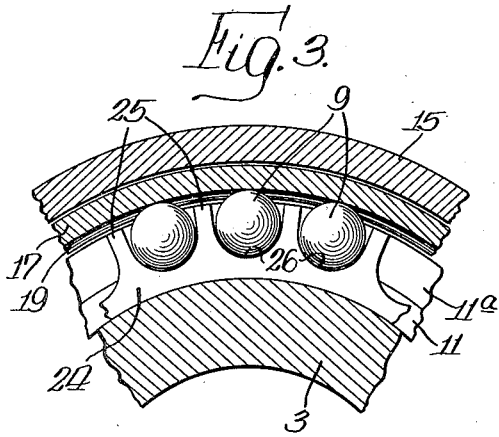
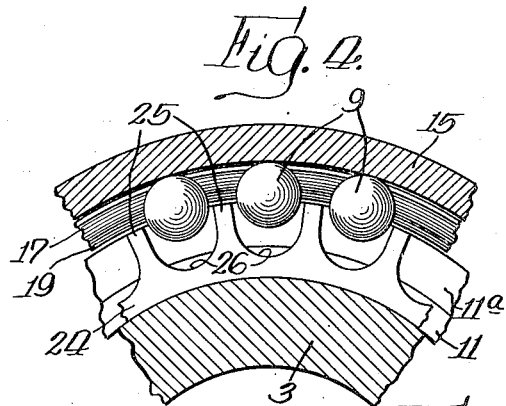
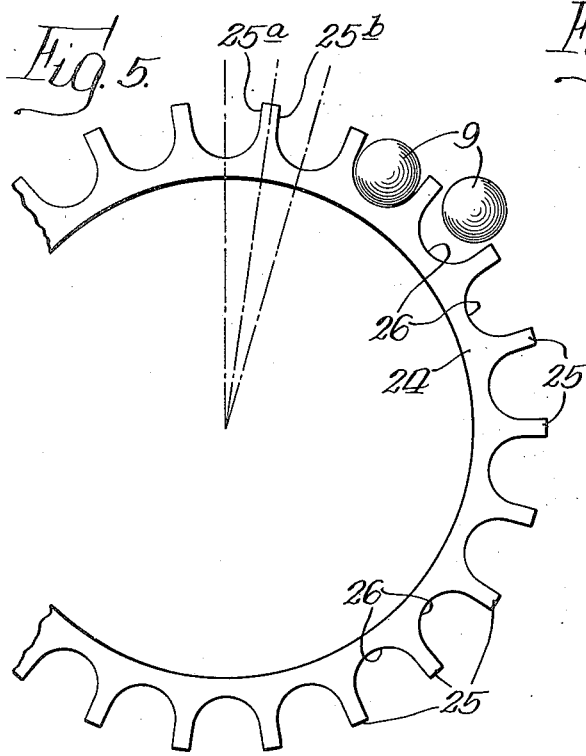
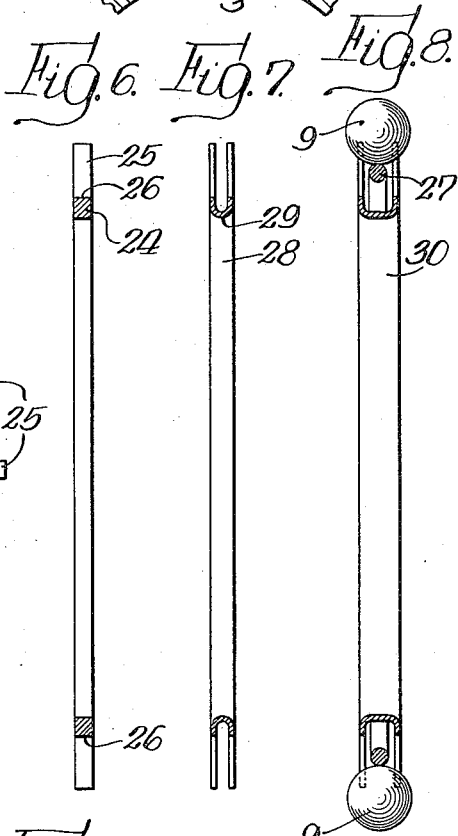
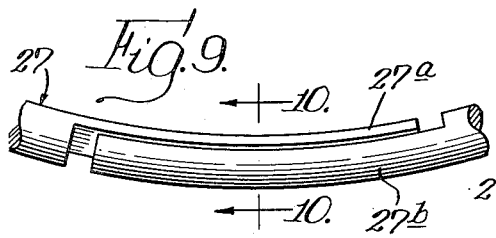
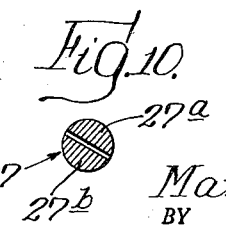
INVENTOR.
Marion L. Fast,
BY Osgood H. Dowell
Atty.

May 9, 1950     M. L. FAST     2,506,713
CAM OPERATED CLUTCH
Filed Nov. 9, 1945     3 Sheets-Sheet 3

INVENTOR.
Marion L. Fast,
BY Osgood H. Dowell
Atty.

Patented May 9, 1950

2,506,713

UNITED STATES PATENT OFFICE 2,506,713

CAM OPERATED CLUTCH

Marion L. Fast, South Bend, Ind., assignor to Dodge Manufacturing Corporation, Mishawaka, Ind., a corporation of Indiana Application November 9, 1945, Serial No. 627,676

3 Claims. (Cl. 192—93)

My invention aims to provide an improved friction clutch of the type in which clutching pressure is applied by forcibly contracting an annular series of balls acting wedgingly between an abutment and an axially movable thrust-transmitting member, the thrust exerted on said member being transmitted to the presser plate of the friction clutching means.

A clutch of one practicable construction embodying the invention is shown for illustration in the accompanying drawings wherein:

Fig. 1 is a view half in longitudinal section and half in side elevation of the illustrative clutch shown in closed or applied condition.

Fig. 2 is a portion of a longitudinal section showing the position of the balls when the clutch is released.

Fig. 3 is a partial cross section taken on the line 3—3 of Fig. 1, looking in the direction of the arrows.

Fig. 4 is a partial cross section on the line 4—4 of Fig. 2.

Fig. 5 is an end elevation, partly broken away, of a ball spacing ring incorporated in the illustrative clutch.

Fig. 6 is a longitudinal section of said ring.

Figs. 7 and 8 are similar sections of ball spacing rings made as sheet metal stampings, that of Fig. 8 being shown in association with certain other elements.

Figs. 9 and 10 are an enlarged elevation and cross section of the joint in an expansible spring ring incorporated in the illustrative clutch.

Figure 11:
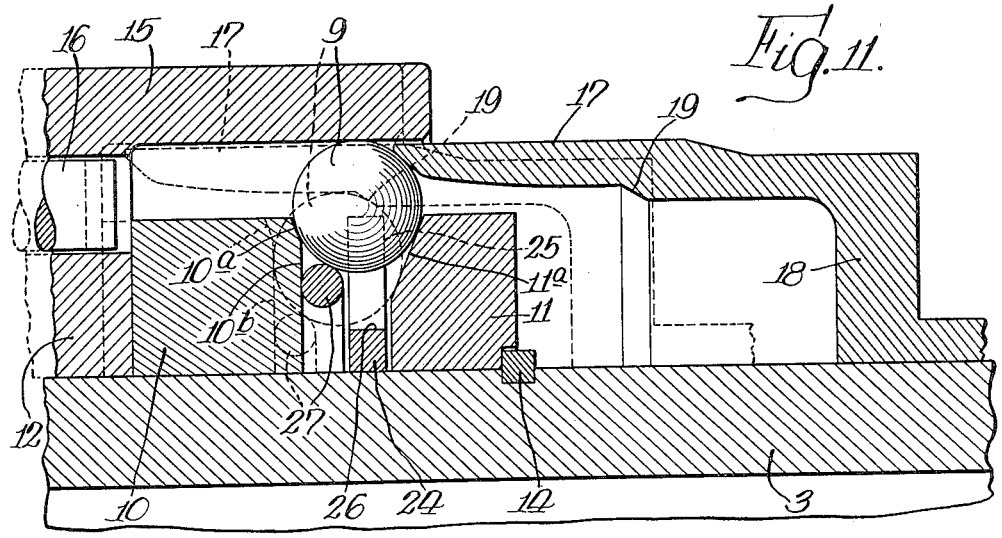
Fig. 11 is an enlarged view in longitudinal section of a portion of the pressure-applying mechanism in released condition, and indicating in dotted lines the positions of the parts when the clutch is applied.

The drawings represent an embodiment of the invention in a large friction disc clutch comprising plates 1 and 2 coactive for clamping the disc 4, said plates being carried by and in driving connection with a hub or sleeve 3 to be fixed on a driving or driven shaft and said disc 4 being held by a ring 5 to be fixed to the rotatable member (not shown) to which the shaft is to be clutched. The plate 1, which may be axially fixed or otherwise held from outward displacement, sustains the pressure applied by the axially movable presser plate 2, the latter being slidable on and suitably splined to the hub. In the specific construction shown, desirable for a large friction disc clutch, the hub 5 is integral with the plate 1 and has the presser plate 2 splined thereto by means of gear-like teeth 6 on the hub slidably interfitted with internal teeth of the presser plate. The friction disc 4 is shown similarly splined to its carrying ring 5 by peripheral disc teeth 7 slidably interfitted with internal teeth of said ring. A plurality of clutch-releasing springs 8 compressed between and reacting against the plates 1 and 2 force the presser plate 2 rearwardly, normally holding it as far away from the plate 1 as it is permitted to go.

The pressure applying mechanism of the illustrative clutch comprises a contractible annular series of steel balls 9 acting wedgingly between a pair of hardened metal rings 10 and 11 having outwardly diverging adjacent end faces engaged by the balls, these rings being slidably fitted on the hub, the ring 10 being axially movable and abutting an axially movable exteriorly screwthreaded thrust transmitting member 12 carrying an adjusting ring or nut 13 screwed thereon and abutting the presser plate 2, and the ring 11 functioning as an axially fixed reaction member or thrust-sustaining abutment, being held in place in this instance by a snap ring 14, i. e. a contractible split ring engaging an annular groove in the hub. The ring 10 could be integral with the member 12 but for simplicity and economical manufacturing practice is made as a separate hardened metal element, and for a similar reason the thrust-sustaining abutment 11 is provided by a separate hardened metal ring held against displacement rearwardly by a snap ring. The rings 10 and 11 instead of being hardened could be faced by hard metal liners or washers. The thrust-transmitting member 12, which is cup-shaped and contains the balls and ring 10 in the tubular part 15 thereof, is slidably fitted on the hub but rotates in unison with the clutch plates, being held in driving connection with and in fixed angular relation to the presser plate by dowel pins 16 fixed in said plate and fitting slidably in said member. There is no need to spline the rings 10 and 11 to the hub.

It will be understood that as the balls 9 are forced inwardly, the thrust exerted on the ring 10 is transmitted by the member 12 and adjusting ring or nut 13 thereon to the presser plate 2 for forcing it into disc-clamping coaction with the reaction plate 1, or in other words for applying or closing the clutch, and that in the release action of the clutch the pressure of the clutch-releasing springs 8, transmitted by the presser plate and elements 13, 12 and 10, will force the balls outwardly, their outward movement being limited in this instance by the tubular part 15 against which they bear when the clutch is open or fully released. It will also be understood that by axially adjusting the ring nut 13 the axial relation of the presser plate 2 to the plate 1 in the released condition of the clutch is affected, whereby the clutch can be adjusted to permit precisely the right axial movement as a unit of the abutting elements 2, 13, 12 and 10, and the clearance between the friction clutching elements may be taken up to compensate for wear.

The clutch is applied and released by reversely shifting an axially movable cam sleeve 17 fitting slidably in 15 and having a neck portion 18 slidably fitted on the clutch hub. In the release position of the cam sleeve indicated in Fig. 2, the outwardly pressed balls are in contact with 15 and with outer portions of the confronting faces of the rings 10 and 11. Upon forcing the cam sleeve forwardly from its release position, its interior cam surface coacts with the balls to force them inwardly, thereby forcing the ring 10 in a direction away from the ring 11. The cam surface is shaped to effect contraction of the annular series of balls to the position shown in Figs. 1 and 3 by forward movement of the cam sleeve from its releasing position to the Fig. 1 position. Forward movement of the cam sleeve is limited by engagement with the balls of a stop shoulder 19 in the cam sleeve. The interior cam surface of the sleeve is preferably so shaped that when the balls are seated against said shoulder 19 they bear outwardly against a part of said surface which is either cylindrical or of very slightly larger diameter than the so-called highest point of the cam or part thereof immediately in front of the plane the ball centers. In other words, the cam surface is shaped to effect a self-locking of the clutch in applied or closed condition. Retractive fovement of the cam sleeve is limited by a back stop provided in this instance by a snap ring 20. There is no need to spline the cam sleeve to the hub, and preferably it is freely rotatable as well as slidable thereon. For actuating the cam sleeve, it may be connected in a conventional or any suitable manner to actuating means. As shown, it has swiveled thereto a collar 21 fitted in the annular groove in 18, said collar comprising mating half parts separably connected by the bolts 22 and having diametrically opposite trunnions 23 for engagement by the yoke arms of a clutch-throw lever (not shown).

Among other advantages of the construction described is the cooperation of the cam sleeve 17 and cup-shaped thrust-transmitting member 12 with each other and with the hub to completely enclose the annular series of balls and the rings 10 and 11, preventing entrance of dirt or foreign matter to the ball groove formed by and between said rings. Also the cup-shaped member 12 having the cam sleeve slidable therein obviates the need of an extension of the cam sleeve to hold the balls in their released or outer positions, thus shortening the mechanism and contributing to compactness of construction.

To allow a sufficient axial movement of the presser plate 2 for proper clutch release, and yet to obtain a tight closing of the clutch by a short radial movement of the balls and with mechanical advantage, the rings 10 and 11 have their confronting faces formed with outer ball-engaging portions diverging at a greater angle than the angle of divergence of inner ball-engaging portions of said faces. In the illustrative mechanism the ring 10 has outer conical and inner flat ball-engaging surfaces 10$^a$ and 10$^b$ confronting the conical ball-engaging face 11$^a$ of the ring 11, the included angle between 10$^a$ and 11$^a$ being accordingly larger than the included angle between 10$^b$ and 11$^a$. The balls during a substantial part of their inward movement are in contact with 10$^a$, but are forced between 10$^b$ and 11$^a$ as the annular series is further contracted. In applying the clutch, as the balls are forced inwardly in contact with 10$^a$ and 11$^a$, a relatively large proportion of axial movement is imparted to the presser plate 2, after which the friction clutching elements are pressed tightly together or against one another by the further forcing of the balls inwardly in contact with the flat surface 10$^b$, the latter action being accomplished with mechanical advantage since the pressure applied to contract the annular series of balls is parallel with the surface 10$^b$ and at only a relatively small angle (e. g. 22½°) to the beveled surface 11$^a$. In this connection, the interior cam surface of the cam sleeve 17 is shown shaped to effect first a quick inward movement of the balls in contact with the surface 10$^a$ and then a more gradual inward movement. In the releasing action as soon as the balls move outwardly from contact with the flat surface 10$^b$, the clutch may open fully as fast as the cam sleeve 17 is retracted. According to the particular design of the illustrative mechanism, the slant of the surface 10$^a$ to the vertical is twenty degrees and the slant of the surface 11$^a$ is twenty-two and one-half degrees, so that the included angle between 10$^a$ and 11$^a$ is forty-two and one-half degrees; it being understood that this is exemplary and that the design of the mechanism with respect to the proportions and arrangement of the balls and ring surfaces with which they contact and the angle or angles of divergence of such surfaces may be variously modified to suit different requirements and conditions.

Provision is made for maintaining the balls 9 in separated relation and guiding their movements as the annular series expands and contracts, whereby to avoid the increased resistance to actuation that would result from congregating of balls in their outer positions in contact with one another and consequent crowding and shoving of balls laterally by one another as they are forced inwardly in contact under pressure with the elements which they wedge apart. To relieve the mechanism from such increased resistance is especially important in applications thereof to clutches of large size or for large torque transmission, in which the applied pressures are such that crowding and pushing of the balls against one another as they are forced inwardly would objectionably augment the effort required for actuation.

Fitted on the clutch hub between the rings 9 and 10 is a spider-shaped ring 24 whose radiating arms 25 extend between and space the balls from one another and guide them for movement inwardly and outwardly, the form and proportions of the spacer ring being appropriate for accommodating the balls in their inner position and for spacing them in their outer positions, though in both inner and outer positions the balls must of course protrude from the spacer ring beyond the tips of said arms as well as beyond the opposite faces of the ring. As shown, the arms 25 extend outwardly beyond the circle of centers of the balls in their inner positions such a distance that the balls in their outer positions are sufficiently within the ring to be held in spaced or separated relation. Reconciliation of the duty of spacing the balls in their outer positions with the necessity of clearance between the spacer ring and part 15 for the cam sleeve 17 requires that the axial movement imparted to the presser plate 2 by contracting the annular series of balls be accomplished with a movement of the balls through a radial distance not much if any greater than half of the diameter of the balls. This distance in the illustrative mechanism is substantially less than half of the diameter of the balls, which is particularly favorable for utilization of the kind of spacer ring described. Other conditions necessary to be fulfilled by the mechanism incorporating the spacer ring are a sufficient clearance between the clutch hub and balls in their inner positions to accommodate the central portion of the ring encircled by the annular series of balls, and a sufficient clearance between the inner portions of the rings 10 and 11 in the released condition of the mechanism to accommodate the spacer ring without obstructing release movement of the ring 10.

The spacer ring 24, though susceptible of being cut in the form shown from a metal plate, may be more economically made as a die casting. In the form shown, the ring is characterized by closely spaced radial guide-ways having semi-circular inner portions and by arms 25 having gradually increasingly widened base portions formed between the arcuate walls 26 of adjacent guide-ways (Fig. 5). This gives a ring of strong and rugged construction, capable of withstanding the strains imposed by action of the balls against the radiating arms; and it permits utilization of a multiplicity of balls in closely spaced relation, as is desirable for effective distribution of the pressure imposed on and transmitted by the annular series of balls. The side walls of the ball-guiding ways beyond their semicircular inner portions are tangent to the arcs 26 and parallel either to radii bisecting said arms or to radii bisecting the guide-ways for the balls. In the latter case, the side walls of every individual guide-way would be parallel with each other, which may be preferable in some cases; though the guide-ways of the spacer ring shown are slightly flaring, since the opposite sides of the portions of the arms 25 extending beyond the circle of centers of the arcs 26 are shown tangent to said arcs and parallel to radii bisecting said arms, as indicated in Fig. 5 by the surfaces 25$^a$ and 25$^b$. This point of design is provided to facilitate manufacture of the spacer ring as a die casting.

There is no need to spline the spacer ring to the clutch hub. Preferably it is freely rotatable thereon, to permit rotative movement relative to the hub of the spacer ring and annular series of balls in case such relative movement would want to occur in any phase of actuation or release or while the clutch rotates in released condition. Nor is there any need to restrain the spacer ring from axial movement, though it could be held adjacent to 11 by appropriate means, as by a spring (not shown) compressible between 10 and 24 or by a small snap ring (not shown) adjacent to 24.

The clearance shown between 10 and 24 is sufficient to accommodate a spacer ring of such width or longitudinal thickness that in all relative positions of the ring and balls the plane of the ball centers would be in the spacer ring or between the planes of its opposite end faces. However it is unnecessary to use such a wide spacer ring. With the thinner spacer ring 24 in the illustrative mechanism the plane of centers of the balls when in their outer positions is in the spacer ring, though as the balls approach their inner positions their centers pass out from the spacer ring, this having been found to be permissible.

There is shown between 10 and 24 a contracted spring ring 27 operating expansively and pressing outwardly against the balls, said spring ring being held against 10 by the balls. This spring ring 27 may consist of a piece of resilient wire bent into ring form and having overlapping end portions of reduced thickness as indicated at 27$^a$ and 27$^b$ in Figs. 9 and 10. Although in the illustrative mechanism the clutch-releasing springs 8 may be depended upon to force the balls outwardly when the cam sleeve 17 is retracted, the spring ring 27 may be employed to assist such action or to promote quick release of the balls, and in other constructions such a spring ring may be utilized either to supplement the action of clutch-releasing springs or as the means for the function of forcing out the balls, which function is of course assisted by the centrifugal force on the balls.

Fig. 7 shows in section a spacer ring 28 similar to 24 except that the ring 28 is made as a double-walled sheet-metal stamping having the fold in the metal at its center as indicated at 29. As shown in Fig. 8, a similar wider ring 30 could be used instead of 24 with the spring ring 27 arranged within the spacer ring 30.

It will be observed that the described mechanism, in addition to having the advantageous features and characteristics hereinbefore indicated, is of a construction which is quite simple and easy to assemble; that the hub sleeve extension behind the presser plate is or may be of uniform outside diameter, except for annular grooves therein for the snap rings 14 and 20, said hub extension being devoid of any flange or external shoulder or projection, thus permitting the several annular elements fitted thereon to be of the same bore and to be easily successively applied by slipping them over the rear end of said hub extension; that there are no interengaging keys and keyways between said elements and the hub (though the member 12 is held in driving connection with the presser plate by the dowel pins 16); and that the balls can be assembled in the mechanism without special difficulty or liability of spilling out as they are inserted. In assembling, the hub having the friction clutching means and the elements 12, 13 and 10 in assembly therewith can be held in vertical position and the balls can be dropped into place, the spring ring 27 having been first introduced into the cup-like member 12 and being held contracted while dropping in the balls. The spacer ring 27 may be applied before or after dropping in the balls. The ring 11 and its retaining snap ring 14 may then by applied, whereupon the cam sleeve or actuator 17 can be applied and retained in its proper limits of travel by the snap ring 20.

Figure 12:
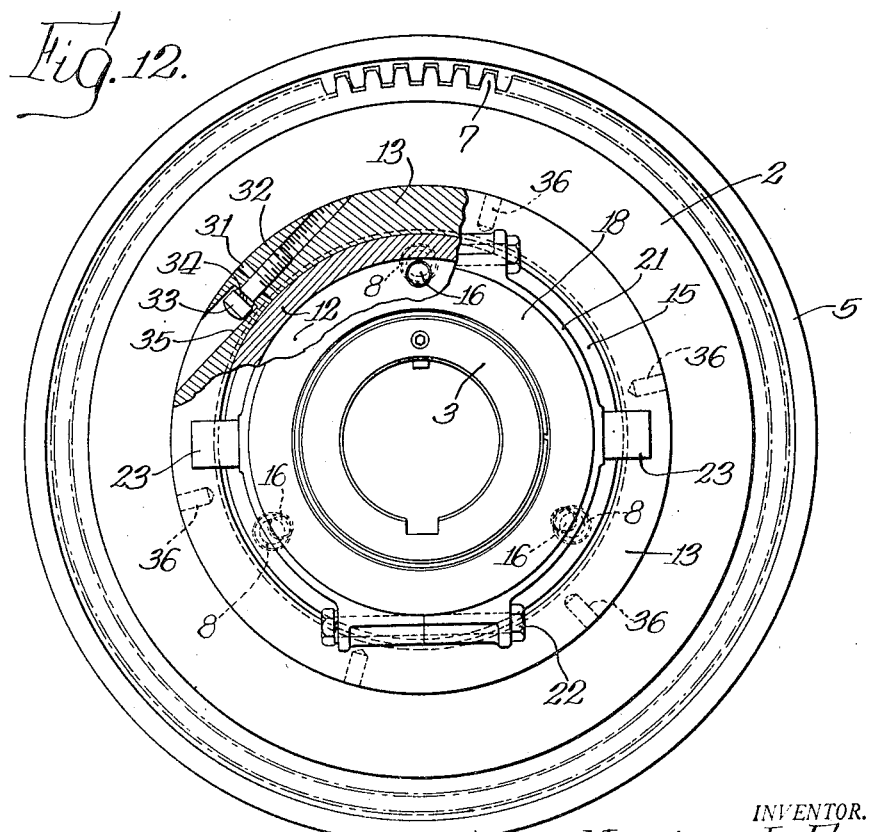
Fig. 12 is a rear end elevation of the clutch on a reduced scale, partly in cross section on the line 12—12 of Fig. 1.

As shown in Fig. 12, the adjusting nut 13 of the illustrative clutch comprises an interiorly screw-threaded split ring contractible against the threads of the member 10 for securing the ring in its adjusted position relative to said member; the end portions of said ring at opposite sides of its split or gap 31 being connected by a cap screw 32 to be tightened for contracting the ring; the cap screw being parallel to a tangent and entirely within the ring. As shown, the screw head 33 bears against a spring washer 34 seated at the inner end of the bore 35 in which the screw head fits, said screw head being cylindrical and having a socket for engagement by a wrench. The ring 13 is provided with angularly spaced barring holes, one being shown as 36, engageable by a bar or rod to be used as a lever for rotating the adjusting nut when the screw 32 is loosened sufficiently to permit such operation.

It will be understood that the invention or features thereof may be variously applied to large and small clutches, including multiple disc clutches, having friction clutching means including an axially movable presser plate to which pressure is applied for pressing the friction clutching elements together or against one another.

The clutch herein described embodies an invention described and claimed in my co-pending application Serial No. 520,469, filed January 31, 1944, now issued as Patent 2,397,414, dated March 26, 1946, which invention is also shown but not claimed in my co-pending application Serial No. 520,470, now Patent No. 2,443,901, issued June 22, 1948, for Locking means for clutch adjusting rings.

I claim:

1. A friction clutch having pressure applying means comprising a contractible annular series of balls and confronting annular members having outwardly diverging faces contacting with the balls at opposite sides of the plane of ball centers, one of said members being axially movable and normally coacting with the other to maintain said series in an expanded condition and being forcibly displaceable in a direction away from said other by the wedging of the balls therebetween as said series is contracted, and a radially expansible spring ring consisting of a resilient wire of round cross-section bent into ring form and having overlapping reduced end portions arranged within the annular series of balls to one side of the plane of ball centers and held by the balls against the adjacent one of said members, said spring ring being sprung into the annular crotch between said series and adjacent one of said members and normally resiliently urging the balls outwardly.

2. A friction clutch having pressure applying means comprising a contractible annular series of balls and confronting annular members having outwardly diverging faces contacting with the balls at opposite sides of the plane of ball centers, one of said members being axially movable and normally coacting with the other to maintain said series in an expanded condition and being forcibly displaceable in a direction away from said other by the wedging of the balls therebetween as said series is contracted, a radially expansible spring ring consisting of a resilient wire of round cross-section bent into ring form and having overlapping reduced end portions arranged within the annular series of balls to one side of the plane of ball centers and held by the balls against the adjacent one of said members, said spring ring being sprung into the annular crotch between said series and adjacent one of said members and normally resiliently urging the balls outwardly, and a flat ball-spacing ring of a thickness less than half of the diameter of the balls arranged between said spring ring and the other of said members.

3. A friction clutch having pressure applying means comprising a contractible annular series of balls and confronting annular members having outwardly diverging faces contacting with the balls at opposite sides of the plane of ball centers, one of said faces comprising an annular flat surface and the other comprising a conical surface confronting said flat surface, one of said members being axially movable and normally coacting with the other to maintain said series of balls in an expanded condition and being forcibly displaceable axially in a direction away from said other by the wedging of the balls therebetween as said series is contracted, and a radially expansible spring ring consisting of a resilient wire of round cross-section bent into ring form and having overlapping reduced end portions arranged within the annular series of balls at the side of the plane of ball centers adjacent to said flat surface and held by the balls against said flat surface, said spring ring being sprung into the annular crotch between said flat surface and series of balls and normally resiliently urging the balls outwardly and against said conical surface.

MARION L. FAST.

REFERENCES CITED

The following references are of record in the file of this patent:

UNITED STATES PATENTS

| Number | Name | Date |
|---|---|---|
| 1,913,030 | Hux | June 6, 1933 |
| 2,010,925 | Nahashian | Aug. 13, 1935 |
| 2,185,714 | Scherer | Jan. 2, 1940 |
| 2,367,390 | Firth et al. | Jan. 16, 1945 |
| 2,376,799 | Miller | May 22, 1945 |
| 2,397,414 | Fast | Mar. 26, 1946 |
| 2,401,864 | Gerst | June 11, 1946 |
| 2,402,897 | Kindig et al. | June 25, 1946 |
| 2,407,060 | Croft | Sept. 3, 1946 |

FOREIGN PATENTS

| Number | Country | Date |
|---|---|---|
| 209,456 | Great Britain | Jan. 11, 1924 |
| 379,921 | Great Britain | Sept. 8, 1932 |
| 455,222 | Great Britain | Oct. 12, 1936 |